United States Patent
Friedrich et al.

[15] 3,679,674
[45] July 25, 1972

[54] BASIC HEMICYANINE DYESTUFFS

[72] Inventors: Herbert Friedrich, Offenbach/Main; Gunther Trapp, Frankfurt/Main, both of Germany

[73] Assignee: Farbwerke Hoechst Aktiengesellschaft vormals Meister Lucius & Bruning, Frankfurt/Main, Germany

[22] Filed: June 13, 1969

[21] Appl. No.: 833,198

[30] Foreign Application Priority Data

June 20, 1968 Germany..................P 17 69 631.0

[52] U.S. Cl.............260/240.8, 106/193 D, 117/138.8 R, 117/138.8 F, 117/142, 260/37 N, 260/37 NP, 260/41 C
[51] Int. Cl. ..............................................C07d 27/30
[58] Field of Search....................260/240.8, 240.9

[56] References Cited

UNITED STATES PATENTS 3,311,619  3/1967  Fisher et al. ..................260/240.8

Primary Examiner—Henry R. Jiles
Assistant Examiner—G. Thomas Todd
Attorney—Curtis, Morris & Safford

[57] ABSTRACT

Water-soluble basic dyestuffs of the formula

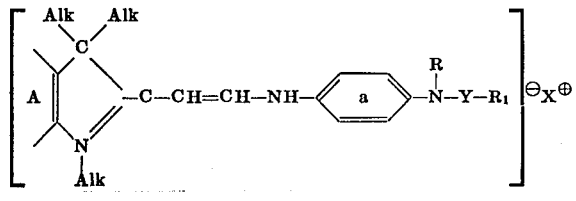

(I)

in which A stands for a benzene or naphthalene radical that may be substituted, ALK represents each a lower alkyl group preferably of one to four carbon atoms, R represents hydrogen or a lower alkyl radical preferably of one to four carbon atoms that may be substituted, Y represents a —CO— or —SO$_2$— group, R$_1$ is an aliphatic, araliphatic, aromatic or heterocyclic radical and X$^-$ represents an anion, and wherein the benzene nucleus $a$ may further contain non-ionic substituents, which are suitable for the dyeing or printing of textile fibrous materials consisting of native or regenerative cellulose, silk, acetate rayon, acid-modified polyamides or polyesters, polyacrylonitrile or polyvinylidene cyanide or leather.

6 Claims, No Drawings

BASIC HEMICYANINE DYESTUFFS

The present invention relates to basic dyestuffs free from sulfonic acid groups and having the general formula I

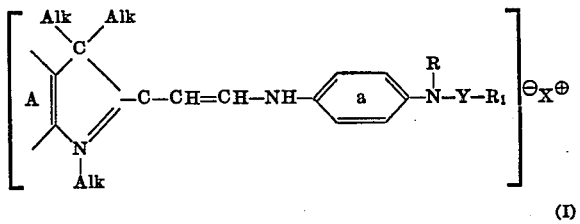

in which A stands for a benzene or naphthalene radical that may be substituted, Alk represents each a lower alkyl group preferably of one to four carbon atoms, R represents hydrogen or a lower alkyl radical preferably of one to four carbon atoms that may be substituted, Y represents a —CO— or —SO$_2$— group, R$_1$ is an aliphatic, araliphatic, aromatic or heterocyclic radical and X$^\ominus$ represents an anion, and wherein the benzene nucleus a may further contain non-ionic substituents.

The dyestuffs of formula I may be prepared by reacting a 1,3,3-trialkylindoline-2-methylene-ω-aldehyde having the general formula II

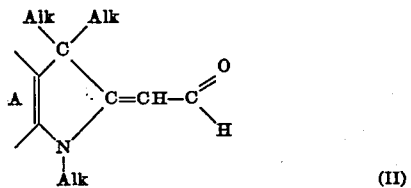

in which A and Alk are defined as above, in the presence of an acidic condensing agent, with an amine of the general formula III

in which Y, R, R$_1$ and a have the meaning given above.

As 1,3,3-trialkylindoline-2-methylene-ω-aldehydes corresponding to formula II there are used according to the present invention, for example 1,3,3-trimethyl-indoline-2-methylene-ω-aldehyde or 1,3,3-triethyl-indoline-2-methylene-ω-aldehyde or derivatives thereof substituted in the benzene nucleus A by halogen atoms, alkyl, alkoxy, nitro, cyano or carbalkoxy groups, moreover, 1,3,3-trialkyl-4,5-benzoindoline-2-methylene-ω-aldehydes.

As amines of formula III for example the following are suited: 1-amino-4-acylaminobenzenes or 1-amino-4-(N-alkyl)-acylamino-benzenes where the acyl radical denotes a radical of an aliphatic, araliphatic, aromatic or heterocyclic carboxylic acid radical, moreover 1-amino-4-alkylsulfonylamino-benzenes, 1-amino-4-aralkylsulfonylaminobenzenes, or 1-amino-4-aryl-sulfonylamino-benzenes or 1-amino-4-(N-alkyl)-alkylsulfonylamino-benzenes, 1-amino-4-(N-alkyl)-aralkylsulfonylamino-benzenes or 1-amino-4-(N-alkyl)-arylsulfonylamino-benzenes; the benzene radical a in the aforesaid amines may carry non-ionic substituents such as halogen atoms, alkyl, alkoxy, nitro, trifluoromethyl, cyano, acyl, acylamino, carboxylic acid amide, sulfone or sulfonic acid amide groups.

The amines of formula III used in the process of the invention can be obtained, for example, by reaction of the corresponding 4-nitro-1-amino-benzenes or 4-nitro-1-alkylamino-benzenes with the corresponding aliphatic, araliphatic, aromatic or heterocyclic carboxylic acid halides. or sulfonic acid halides and subsequent reduction of the nitro group forming the amino group according to known methods.

The reaction of the aldehydes of formula II with the amines of formula III is suitably conducted in an aqueous solution. As acid condensing agents inorganic or organic acids may be used, for example hydrohalic acids, sulfuric acid, nitric acid, phosphoric acid, aliphatic carboxylic acids such as formic or acetic acid, or aromatic sulfonic acids. The dyestuffs generally precipitate automatically from the aqueous reaction medium and can be isolated by filtration. Dyestuffs that are readily soluble may be separated from the reaction mixture by salting out or be isolated in form of their souble-salts by addition of zinc or cadmium halides.

The dyestuffs of the invention corresponding to formula I contain as anion X$^\ominus$ the radical of an inorganic or organic acid, for example, of hydrochloric acid, hydrobromic acid or hydroiodic acid, of a metal-hydrohalic acid, sulfuric acid, nitric acid, of a phosphoric acid, formic acid, acetic acid, oxalic acid or of p-toluene-sulfonic acid.

The new dyestuffs are suitable for the dyeing or printing of tannin-treated natural or regenerated cellulose fibers, silk, leather or fully-synthetic fibers such as acetate rayon or acid-modified polyamides or polyesters fibers, especially of fibers, yarns or tissues consisting of polymers or copolymers of acrylonitrile or vinylidene cyanide. In the majority of cases the yellow dyeings produced by the present dyestuffs on these fibers are very clear and deep in shade nd have a very good fastness to light and wet processing.

The dyestuffs are, in general, largely insensitive toward variations of the pH value of the dyebath being thus applicable as well in weakly acidic or strongly acidic bath. Moreover, they are stable at temperatures above 100° C as practised in high-temperature dyeing. Under normal dyeing conditions wool is completely resisted by these dyestuffs.

The following Examples are to illustrate the invention but they are not intended to limit it thereto; the parts and percentages being be weight unless otherwise stated.

EXAMPLE 1

A mixture of 4 parts of 5-amino-2-acetamino-toluene, 10 parts by volume of 5N hydrochloric acid, 10 parts by volume of water and 5 parts of 1,3,3-trimethyl-2-methylene-indoline-ω-aldehyde were heated shortly to the boil. After cooling the batch, the precipitated dyestuff was drawn off, recrystallized from water and dried at 60° C. 7.4 parts of the dyestuff of formula

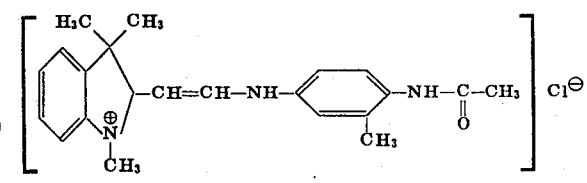

were obtained soluble in water while giving a yellow color.

Five g of that dyestuff were stirred together with 15 ccm of a 50 percent acetic acid and dissolved by pouring on the paste 300 ccm of boiling water. This solution was introduced into a dyeing apparatus into which 6 l of water, 2 g of a condensation product of 30 mols of ethylene oxide with 1 mol of nonylphenol and 3 g of crystalline sodium acetate were fed. Then a cross-wound bobbin containing 500 g of an endless yarn made of polyacrylonitrile was placed into the apparatus and in raising gradually the temperature to 100° C the yarn was dyed at the boil for about 1 hour. Then the bath was cooled to about 70° C and the yarn dyeing completed as usual.

A very clear greenish yellow dyeing of excellent fastness to light and wet processing was obtained.

EXAMPLE 2

A mixture of 5.6 parts of 5-amino-2-benzoylamino-toluene, 10 parts by volume of a 80 percent phosphoric acid, 20 parts by volume of water and 5 parts of 1,3,3-trimethyl-2-methylene-indoline-ω -aldehyde were heated shortly to the boil. After cooling the bath, the precipitated dyestuff was drawn off, recrystallized from water and dried at 60° C. 9.5 parts of the dyestuff of formula

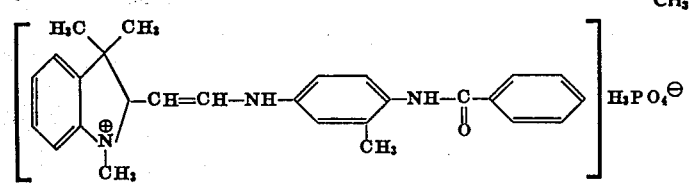

were obtained soluble in water while giving a yellow color.

One g of this dyestuff was stirred to a paste with 2.5 g of a 50 percent acetic acid and dissolved in 6 l of water. To this dyebath 1 g of crystalline sodium acetate and 10 g of calcined sodium sulfate were added. Then 100 g of pre-washed yarn made of polyacrylonitrile staple fiber were introduced into the dyebath being heated to 60° C, then while rising slowly the dyebath temperature to 100° C the yarn was dyed for 1 hour at the boil. Subsequently, the bath was cooled to about 70° C and the yarn rinsed and dried.

A clear, greenish yellow dyeing of excellent fastness to light and wet processing was obtained.

EXAMPLE 3

A mixture of 3.4 parts of 5-amino-2-(N-methyl)-benzene-sulfonylamino-toluene, 5 parts by volume of 5N hydrochloric acid, 15 parts by volume of water and 2.5 parts of 1,3,3-trimethyl-2-methylene-indoline-ω-aldehyde were heated shortly to the boil. After cooling the batch, the precipitated dyestuff was suction-filtered, recrystallized from water and dried at 60° C. 5.2 parts of the dyestuff of formula

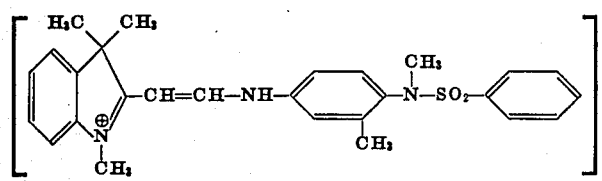

were obtained soluble in water while giving a yellow color.

One g of the dyestuff obtained was stirred into a paste with 2 g of a 50 percent acetic acid and dissolved in 5 l of water. Furthermore to the dyebath 1 g of crystalline sodium acetate was added. Then 100 g of a pre-washed tissue made of acid-modified polyester fiber were introduced therein at 60° C and while raising gradually the temperature of the bath the tissue was dyed during 1 hour at 110° C. Subsequently, the bath was cooled to about 70° C and the yarn rinsed and dried. A greenish yellow dyeing was obtained having a good fastness to light and wet processing.

The following Table lists further dyestuffs which correspond to formula Ia that are obtained according to the process of the present invention as well as the shades produced by said dyestuffs on polyacrylonitrile fibers

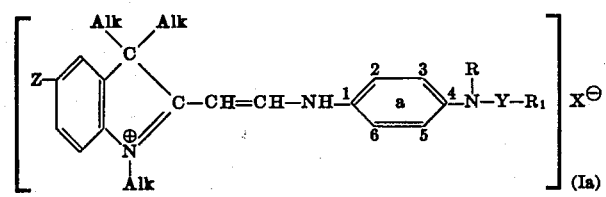

| Alk | Z | Substituent in a | R | Y | $R_1$ | $X^-$ | shade |
|---|---|---|---|---|---|---|---|
| $CH_3$ | H | — | H | CO | $CH_3$ | Cl | Yellowish orange |
| $CH_3$ | H | 3-Cl | H | CO | $CH_3$ | Cl | reddish yellow |
| $CH_3$ | H | 3,5-$Cl_2$ | H | CO | $CH_3$ | Cl | greenish yellow |
| $CH_3$ | H | 2-$OC_2H_5$ | H | CO | $CH_3$ | Cl | " |
| $CH_3$ | H | 3-$OCH_3$ | H | CO | $CH_3$ | Cl | yellow-tinged orange |
| $CH_3$ | H | 2,5-$(OCH_3)_2$ | H | CO | $CH_3$ | Cl | reddish orange |
| $CH_3$ | H | 3-$CH_3$ | H | CO | $CH_3$ | $H_2PO_4$ | greenish yellow |
| $CH_3$ | H | 3,5-$(CH_3)_2$ | H | CO | $CH_3$ | $H_2PO_4$ | " |
| $CH_3$ | H | 2,3-$(CH_3)_2$ | H | CO | $CH_3$ | Cl | yellow |
| $CH_3$ | H | — | $CH_3$ | CO | $CH_3$ | Cl | " |
| $CH_3$ | H | — | $C_2H_5$ | CO | $CH_3$ | Cl | greenish yellow |
| $CH_3$ | H | 3 —$C_2H_4OOCCH_3$ | CO | $CH_3$ | Cl | yellow |
| $CH_3$ | H | -CN | | | | | |
| $CH_3$ | H | — | $CH_3$ | CO | —$CH_2Cl$ | Cl | " |
| $CH_3$ | H | — | $CH_3$ | CO | H | Cl | " |
| $CH_3$ | H | — | H | $SO_2$ | $CH_3$ | Cl | greenish yellow |
| $CH_3$ | H | 3-Cl | H | $SO_2$ | $CH_3$ | Cl | " |
| $CH_3$ | H | 3-$OCH_3$ | H | $SO_2$ | $CH_3$ | Cl | " |
| $CH_3$ | H | 3-$CH_3$ | H | $SO_2$ | $CH_3$ | Cl | " |
| $CH_3$ | H | 2,3-$(CH_3)_2$ | H | $SO_2$ | $CH_3$ | $H_2PO_4$ | " |
| $CH_3$ | H | — | $CH_3$ | $SO_2$ | $CH_3$ | Cl | " |
| $CH_3$ | H | — | H | CO | $C_6H_5$ | COOH, COO | " |
| $CH_3$ | H | 3-$OCH_3$ | H | CO | $C_6H_5$ | Cl | yellow |
| $CH_3$ | H | 2,5$(OCH_3)_2$ | H | CO | $C_6H_5$ | Cl | reddish yellow |
| $CH_3$ | H | 2,5$(OC_2H_5)_2$ | H | CO | $C_6H_5$ | Cl | golden yellow |
| $CH_3$ | H | 3-Cl | H | CO | $C_6H_5$ | $H_2PO_4$ | greenish yellow |
| $CH_3$ | H | 3-$CH_3$ | H | CO | $C_6H_5$ | Cl | " |
| $CH_3$ | H | 2-$OCH_3$-5-$CH_3$ | H | CO | $C_6H_5$ | Cl | yellow |
| $CH_3$ | H | — | $CH_3$ | CO | $C_6H_5$ | Cl | greenish yellow |
| $CH_3$ | H | — | H | CO | —$C_6H_4CH_3$-4 | $H_2PO_4$ | " |
| $CH_3$ | H | 3-$OCH_3$ | H | CO | —$C_6H_4CH_3$-4 | Cl | yellow |
| $CH_3$ | H | 3-$CH_3$ | H | CO | —$C_6H_4CH_3$-4 | $H_2PO_4$ | greenish yellow |
| $CH_3$ | H | — | $CH_3$ | CO | —$C_6H_4CH_3$-4 | $H_2PO_4$ | " |
| $CH_3$ | H | — | H | CO | —$C_6H_4OCH_3$-4 | Cl | yellow |
| $CH_3$ | H | — | H | CO | —$C_6H_4OH$-2 | $H_2PO_4$ | greenish yellow |
| $CH_3$ | H | 3-$CH_3$ | H | CO | —$C_6H_4OH$-2 | $H_2PO_4$ | " |
| $CH_3$ | H | 3,5-$(CH_3)_2$ | H | CO $C_6H_5$ | | $H_2PO_4$ | yellow |
| $CH_3$ | H | 3-$CH_3$ | H | CO | —$C_6H_4N(CH_3)_2$-4 | $H_2PO_4$ | reddish yellow |
| $CH_3$ | H | — | H | CO | —$C_6H_4N(CH_3)_2$-4 | $H_2PO_4$ | " |
| $CH_3$ | H | — | H | $SO_2$ | $C_6H_5$ | Cl | greenish yellow |
| $CH_3$ | H | 3-$OCH_3$ | H | $SO_2$ | $C_6H_5$ | Cl | " |
| $CH_3$ | H | 3-$CH_3$ | H | $SO_2$ | $C_6H_5$ | Cl | " |
| $CH_3$ | H | 3,5-$(CH_3)_2$ | H | $SO_2$ | $C_6H_5$ | $H_2PO_4$ | " |
| $CH_3$ | H | 2,3-$(CH_3)_2$ | H | $SO_2$ | $C_6H_5$ | $H_2PO_4$ | " |
| $CH_3$ | H | — | $CH_3$ | $SO_2$ | $C_6H_5$ | Cl | " |
| $CH_3$ | H | — | $CH_3$ | $SO_2$ | $C_6H_5$ | Cl | " |
| $CH_3$ | H | — | $C_2H_5$ | $SO_2$ | $C_6H_5$ | Cl | " |
| $CH_3$ | H | 3-$CH_3$ | $CH_3$ | $SO_2$ | $C_6H_5$ | $H_2PO_4$ | greenish yellow |
| $CH_3$ | H | 3-$OCH_3$ | $CH_3$ | $SO_2$ | $C_6H_5$ | Cl | greenish yellow |
| $CH_3$ | $OCH_3$ | 3-$CH_3$ | H | CO | $CH_3$ | $HSO_4$ | yellow |
| $CH_3$ | Cl | 3-$CH_3$ | H | CO | $CH_3$ | $NO_3$ | " |
| $CH_3$ | $OCH_3$ | 3-$CH_3$ | H | CO | $CH_3$ | $CH_3COO$ | " |
| $CH_3$ | H | 3-$OCH_3$ | H | CO $CH_2C_6H_5$ | | $H_2PO_4$ | " |
| $CH_3$ | H | 3-$OCH_3$ | H | CO Pyridino | | $H_2PO_4$ | " |

We claim:

1. Basic dyestuffs free from sulfonic acid groups and having the general formula

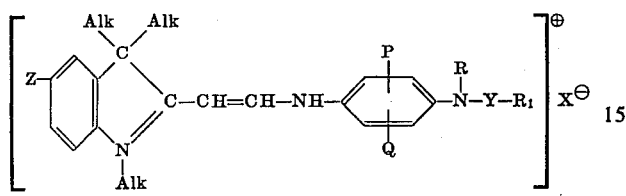

in which Z represents hydrogen, chlorine, lower alkyl, lower alkoxy or carbo-lower alkoxy, Alk represents each lower alkyl, R represents hydrogen or lower alkyl, Y represents —CO— or —SO$_2$—, R$_1$ represents lower alkyl, chloromethyl, benzyl, phenyl, lower alkyl-phenyl, lower alkoxy-phenyl, hydroxyphenyl, di-(lower alkyl)-amino-phenyl or pyridinyl, P and Q each represent hydrogen, chlorine, lower alkyl, lower alkoxy cyano, or lower alkylsulfone, and $\underline{X}^\ominus$ represents an anion.

2. The basic dyestuff of the formula

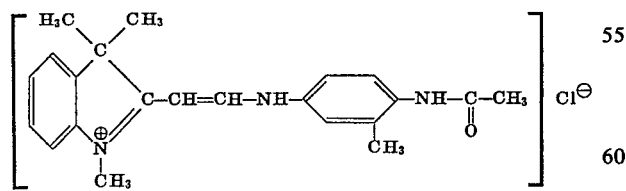

3. The basic dyestuff of the formula

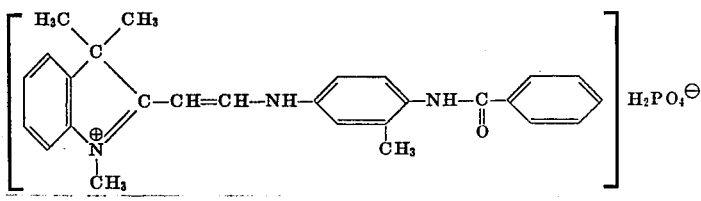

4. The basic dyestuff of the formula

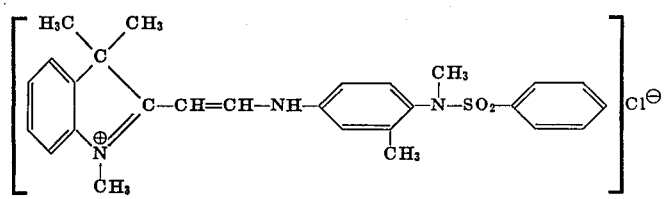

5. The basic dyestuff of the formula

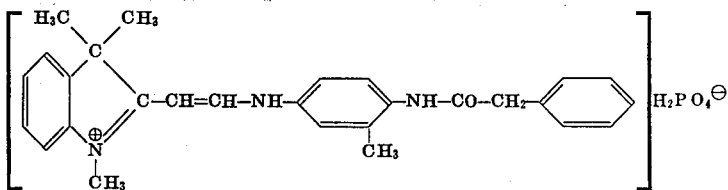

6. The basic dyestuff of the formula

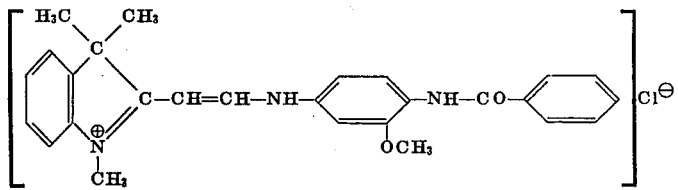

* * * * *